(12) United States Patent
Tanaka

(10) Patent No.: US 7,156,526 B2
(45) Date of Patent: Jan. 2, 2007

(54) PROJECTOR

(75) Inventor: Yoshitada Tanaka, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 445 days.

(21) Appl. No.: 10/099,938

(22) Filed: Mar. 19, 2002

(65) Prior Publication Data

US 2002/0140909 A1 Oct. 3, 2002

(30) Foreign Application Priority Data

Mar. 27, 2001 (JP) ......................................... 2001-090177

(51) Int. Cl.
*G03B 21/22* (2006.01)
*G93B 21/00* (2006.01)

(52) U.S. Cl. ....................................... 353/119; 353/122
(58) Field of Classification Search ................. 353/101, 353/104, 108, 103, 110, 116, 30, 31, 33, 35, 353/119, 122, 69, 70, 68, 36, 46, 47, 48, 79; 352/242, 243; 348/787, 788, 789, 794, 838, 348/836
See application file for complete search history.

(56) References Cited

U.S. PATENT DOCUMENTS 2,525,534 A * 10/1950 Imisse ........................ 248/650
2,745,313 A * 5/1956 Taylor ........................ 353/122
6,185,052 B1 * 2/2001 Fujimori et al. ............ 359/819
6,302,543 B1 * 10/2001 Arai et al. ..................... 353/70
6,390,627 B1 5/2002 Kuroda ........................ 353/119
6,481,855 B1 * 11/2002 Oehler ......................... 353/70
2002/0113951 A1 * 8/2002 Huang et al. ................ 353/119

FOREIGN PATENT DOCUMENTS

| JP | 3-20331 | 2/1991 |
| JP | A 8-304739 | 11/1996 |
| JP | 9-54370 | 2/1997 |
| JP | 2000-029134 | 1/2000 |
| JP | 2001-42423 | 2/2001 |
| WO | WO98/12601 | 3/1998 |

* cited by examiner

*Primary Examiner*—W. B. Perkey
*Assistant Examiner*—Andrew Sever
(74) *Attorney, Agent, or Firm*—Oliff & Berridge, PLC

(57) ABSTRACT

A manipulation button of a first attitude adjusting mechanism is located at a corner on a front side of a lower case. The manipulation button is operated with fingers of one hand while both corners of the front side of the lower case are supported with both hands in controlling the attitude of a projector. With the projector being stably supported it is unlikely for an inclination to occur in right and left directions approximately orthogonal with front and back direction of the projector. Workability during attitude adjustment processes of the projector are thus improved.

9 Claims, 17 Drawing Sheets

PROJECTOR

BACKGROUND OF THE INVENTION

1. Field of the Invention

The present invention relates to a projector, more specifically, relates to a projector having a mechanism for adjusting attitude thereof.

2. Description of Related Art

Conventionally, a projector has been used for presentation in a conference, academic seminar, exhibition etc. The projector modulates a light beam irradiated by a light source in accordance with image information to form an optical image, and projects the optical image on a screen etc. in an enlarged manner.

Recently, projectors have come to be used in a wider area such as presentations in office meetings and on business trips. Further, projectors are now used in technical review sessions in research and development sections by fetching and projecting CAD/CAM/CAE data, in various seminars and workshops, and in school classrooms during audio-visual education. Further, projectors are used for reviewing remedy and medical guidance by projecting medical images and data such as CT scans and MRIs, and for effectively staging exhibitions and events attracting a lot of people.

Since projectors are currently used in such a variety of environments, setup attitude and positional relationship against the screen for the optical image to be projected in an enlarged manner differ in accordance with the environment where the projector is used.

Accordingly, in order to facilitate to see the optical image projected by the projector on the screen, the attitude of the projector relative to the screen has to be appropriately adjusted according to each environment.

In order to conduct attitude adjustment, it is known to provide an attitude adjusting mechanism for adjusting the attitude of the projector to the projector.

One of the attitude adjusting mechanism adjust the attitude of the projector by adjusting a height position on the front side of the projector relative to the back side thereof.

Specifically, the attitude adjusting mechanism is provided at the front center of the projector and has a foot member adapted to advance and retract relative to the projector (an exterior case thereof) and a manipulation button for releasing fixing the advancement and retraction position of the foot member, the manipulation button being provided at the center of the front side of the projector being adjacent to the foot member.

In such arrangement, the user initially lifts the front side of the projector by grabbing one corner on the front side of the projector with one hand. Subsequently, the user presses the manipulation button with a finger while supporting the front center of the projector with the other hand and, keeping the condition, changes the inclination of the projector and releases the manipulation button at a desired position. Accordingly, the foot member is fixed at the desired advancement and retraction position relative to the projector, thereby enabling to adjust the attitude of the projector in front and back direction. Incidentally, the user ordinarily conducts such adjustment work while observing the optical image on the screen.

However, according to the above attitude adjusting mechanism, since the manipulation button is disposed at the front center of the projector, in order to adjust the attitude of the projector, the user has to support one of the corners on the front side of the projector with one hand and simultaneously support the center of the front side of the projector with the other hand, so that the other corner on the front side of the projector remains unsupported.

Accordingly, the projector is extremely unstably supported in adjusting the attitude thereof. Therefore, great inclination in right and left direction approximately orthogonal with the front and back direction is likely to be generated, so that the attitude adjustment work in front and back direction becomes difficult.

SUMMARY OF THE INVENTION

An object of the present invention is to provide a projector capable of improving workability during attitude adjustment work thereof.

A projector according to an aspect of the present invention includes: an optical system that modulates a light beam irradiated by a light source and projects the light beam in an enlarged manner to form a projection image; and a casing that accommodates the optical system, the projection image being projected in a direction from a back side of the casing to a front side thereof, the casing including an attitude adjusting mechanism that adjusts an attitude of the casing, the attitude adjusting mechanism including: a foot member disposed approximately at the center of the front side of the casing, the foot member being advanceable and retractable relative to the casing; a clamp that engages with any of a plurality of engaging grooves formed on the foot member and arranged in an advancement and retraction direction of the foot member to fix the foot member at a desired advancement and retraction position; a manipulation button disposed at a corner on the front side of the casing that causes the clamp out of engagement with the engaging groove; and a link mechanism that interlocks operation of the manipulation button with a movement of the clamp.

According to the present invention, the clamp ordinarily engages with the engaging groove of the foot member so that the advancement and retraction position of the foot member relative to the casing is fixed at a predetermined position, thereby fixing the attitude of the projector in front and back direction at a predetermined attitude.

When the attitude of the casing is adjusted, the manipulation button is pressed to release the engagement of the clamp through the link mechanism, thereby releasing fixing of the advancement and retraction position of the foot member relative to the casing. When the operation of the manipulation button is terminated after appropriately adjusting the advancement and retraction position of the foot member, the clamp again engages with the engaging groove of the foot member to fix the foot member at a desired advancement and retraction position, thereby fixing the attitude of the projector at a desired attitude.

Since the manipulation button for releasing the engagement of the clamp is located at the front corner of the casing, the attitude of the projector can be adjusted by operating the manipulation button while supporting one of the front corners (a corner with no manipulation button disposed) of the casing with one hand and supporting the other front corner of the casing (a corner with the manipulation button disposed) with the other hand.

In other words, when the attitude of the projector is adjusted, since the adjustment work can be conducted while supporting both corners of the projector (casing) with both hands, the projector can be stably supported. Accordingly, inclination in right and left direction approximately orthogonal with the front and back direction of the projector is not likely to be generated, thereby improving workability during attitude adjustment work of the projector.

In the projector of the present invention, the clamp may preferably be held in a manner turnable relative to the casing, the link mechanism may preferably include a turn lever held in a manner turnable relative to the casing, and engagement of the clamp may preferably be released by a combination of the turning movement of the clamp and the turn lever when the manipulation button is operated.

Accordingly, since the clamp and the turn lever can be attached through the turn shafts thereof in assembling the attitude adjusting mechanism on the projector, thereby facilitating assembly work.

Since a mechanism employing a combination of the turning movement of the clamp and the turn lever is used, as compared to a mechanism of combination of linear movement for instance, a space for forming a guide and providing the guide is not necessary, thus simplifying the structure and reducing space thereof.

In the projector according to the present invention, the manipulation lever may preferably be held in a manner turnable relative to the casing, the turn of the manipulation button being transmitted to the turn lever.

Accordingly, since the manipulation button is held in a manner turnable relative to the casing, when the manipulation button is assembled, the manipulation button can be attached to the casing through the turn shaft, thereby facilitating the assembly work.

In the projector according to the present invention, the foot member may preferably be formed approximately in a flat plate, the plurality of engaging grooves may preferably be formed at a central portion of the flat plate, and a slide surface slidable relative to the casing may preferably be formed on both sides of the flat plate sandwiching the central portion.

Accordingly, since the foot member is formed in a flat-plate shape and the slide surfaces are formed on both sides of the flat plate member of the foot member, the foot member can be stably slid relative to the casing, so that the attitude of the engaging groove of the foot member relative to the clamp can be retained approximately constant, thereby securely conducting engaging and releasing the clamp relative to the engaging groove.

Further, since the foot member is formed in a flat plate, the front side of the projector can be stably supported when the foot member is fixed at a predetermined advancement and retraction position.

In the projector according to the present invention, a support member that supports a turn shaft of the clamp may preferably be provided to the casing, and a groove extending along the advancement and the retraction direction of the foot member may preferably be formed between the central portion and the both sides, the support member being disposed in the groove.

Accordingly, since the support for supporting the turn shaft of the clamp is located in the groove along the advancement and retraction direction of the foot member, the support can be located adjacent to the foot member, thus locating the clamp adjacent to the foot member, so that, when the clamp is turned to engage with or detach from the foot member, the turn amount can be reduced and space therefor can also be reduced.

In the projector according to the present invention, the support for supporting the turn shaft of the manipulation button may preferably be integrally formed inside the casing.

Accordingly, the number of the components can be reduced and it is only necessary to attach the turn shaft of the manipulation button to the support of the casing, so that the installation of the manipulation button to the projector can be facilitated.

In the projector according to the present invention, a first end of the turn lever may preferably be point-contacted with the clamp, and a second end of the turn lever may preferably be point-contacted with the manipulation button.

According to the above arrangement, since the first end of the turn lever and the clamp point-contact and the second end of the turn lever and the manipulation button point-contact, the force applied between the first end of the turn lever the clamp and the force applied between the second end of the second end and the manipulation button can be applied on the respective contact points. Accordingly, the turn amount of the turn lever in manipulating the manipulation button and the turn amount of the clamp can be made constant, thereby securely interlocking the manipulation of the manipulation button with the movement of the clamp.

In the projector according to the present invention, a biasing means that biases the turn lever in a direction along a turning direction thereof to keep the second end of the turn lever in contact with the manipulation button may preferably be provided to the link mechanism.

Accordingly, since the contact between the second end of the turn lever and the manipulation button can be kept by the biasing means, the shakiness between the turn lever and the manipulation button can be prevented.

In the projector according to the present invention, the biasing means may preferably be a tension spring.

Since the biasing means is the tension spring, the tension spring can be attached to the turn lever by stretching an end of the tension spring while the other end of the tension spring is fixed to the casing, so that the attachment is not necessary to be conducted while compressing the spring as with the compression spring, thereby facilitating attachment work of the biasing means.

DETAILED DESCRIPTION OF PREFERRED EMBODIMENT(S)

An embodiment of the present invention will be described below with reference to attached drawings.

[1. Primary Arrangement of Projector]

Figure 1:
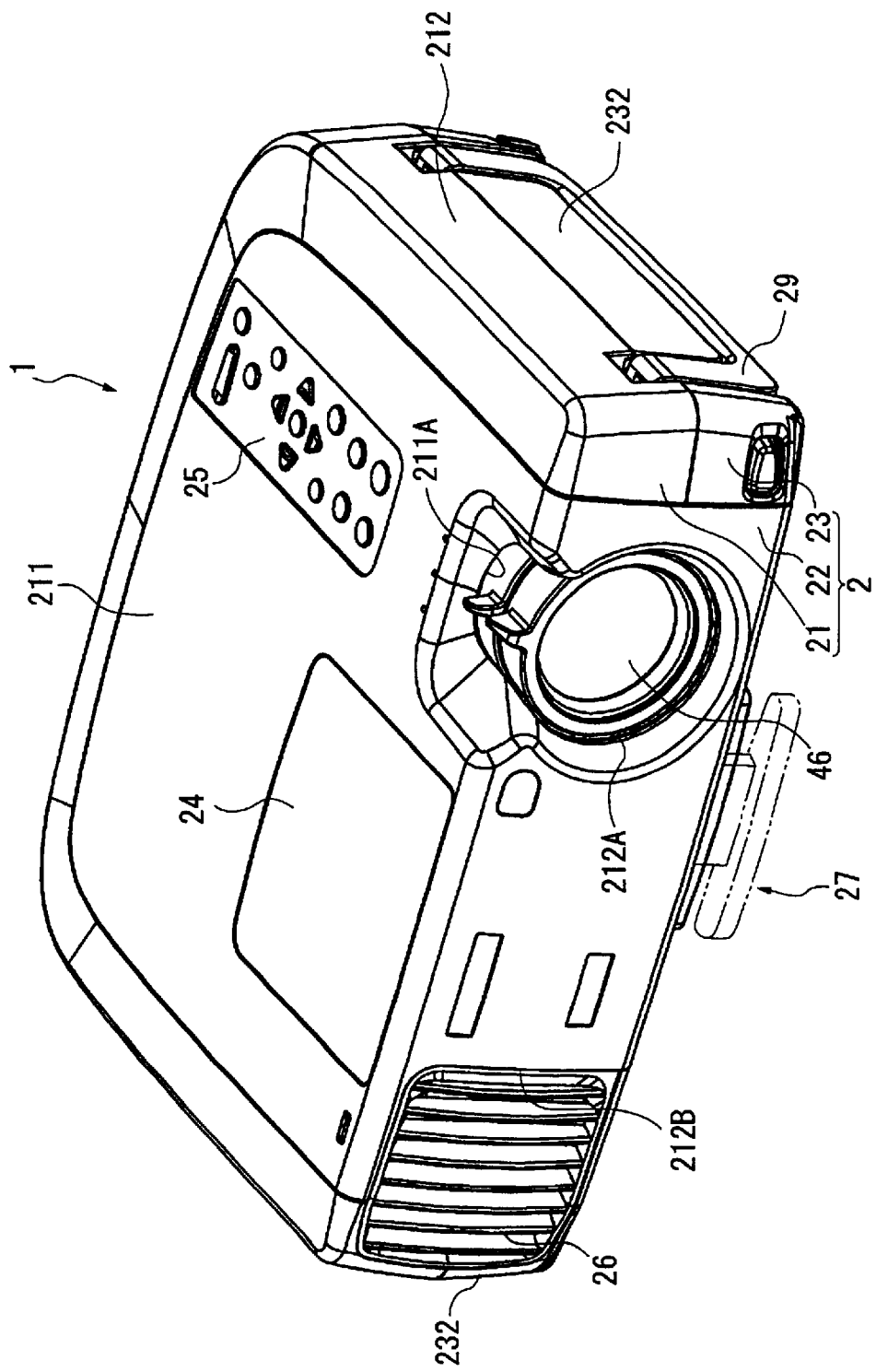
FIG. 1 is an entire perspective view showing a projector according to an embodiment of the present invention seen from above.
Figure 2:
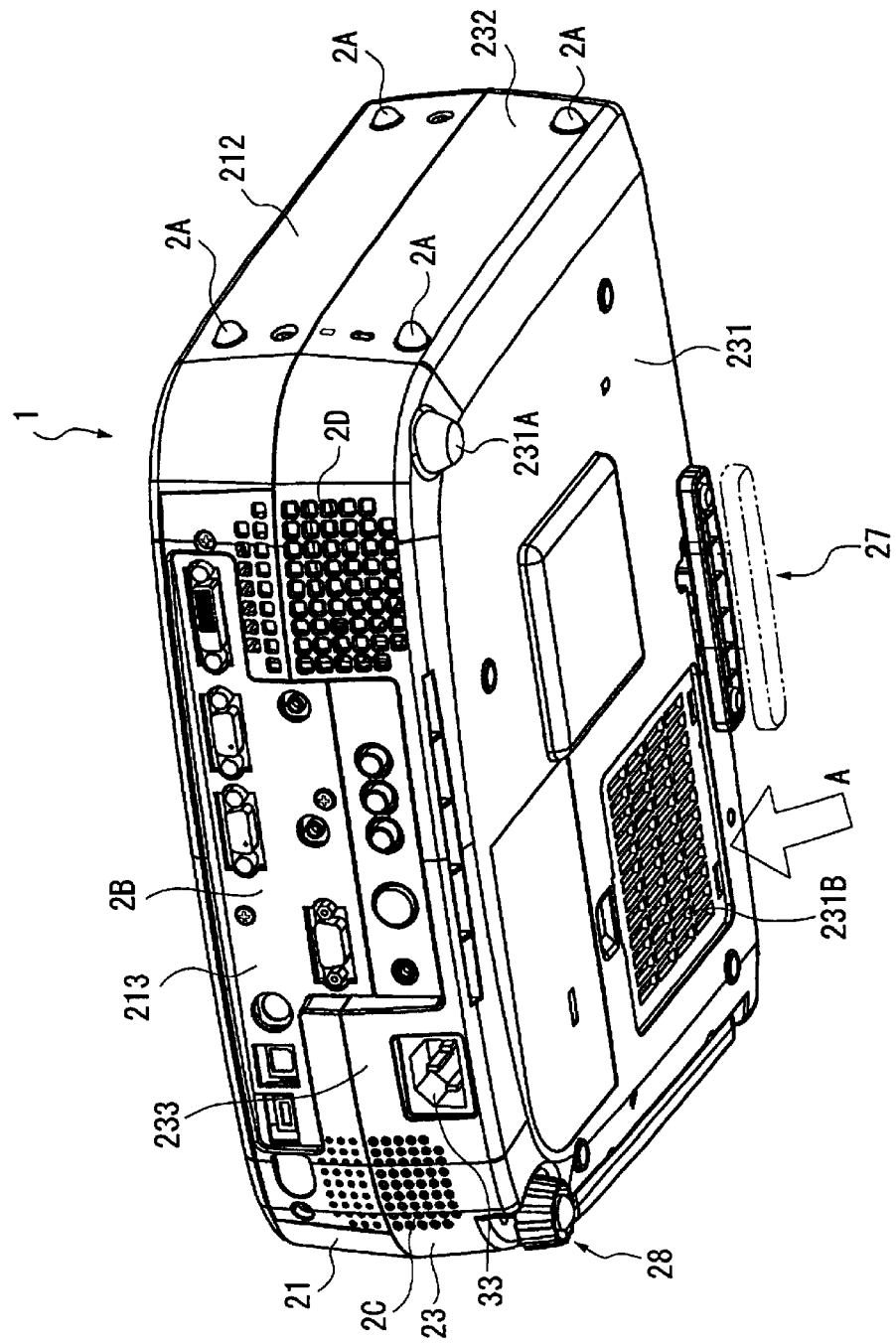
FIG. 2 is an entire perspective view showing the projector according to the aforesaid embodiment seen from below.
Figure 3:
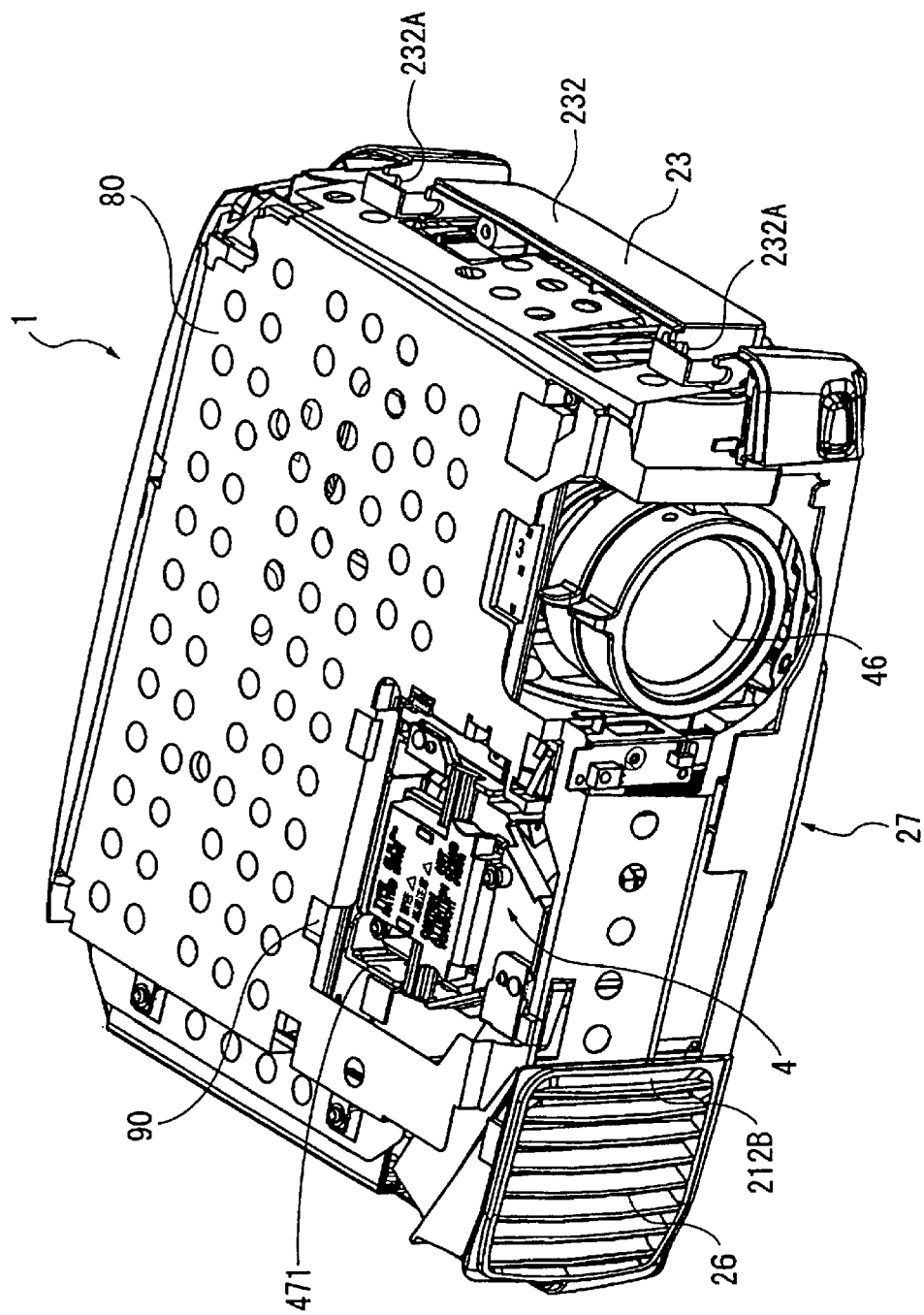
FIG. 3 is a perspective view showing the projector of FIG. 1 with upper case thereof being detached.
Figure 4:
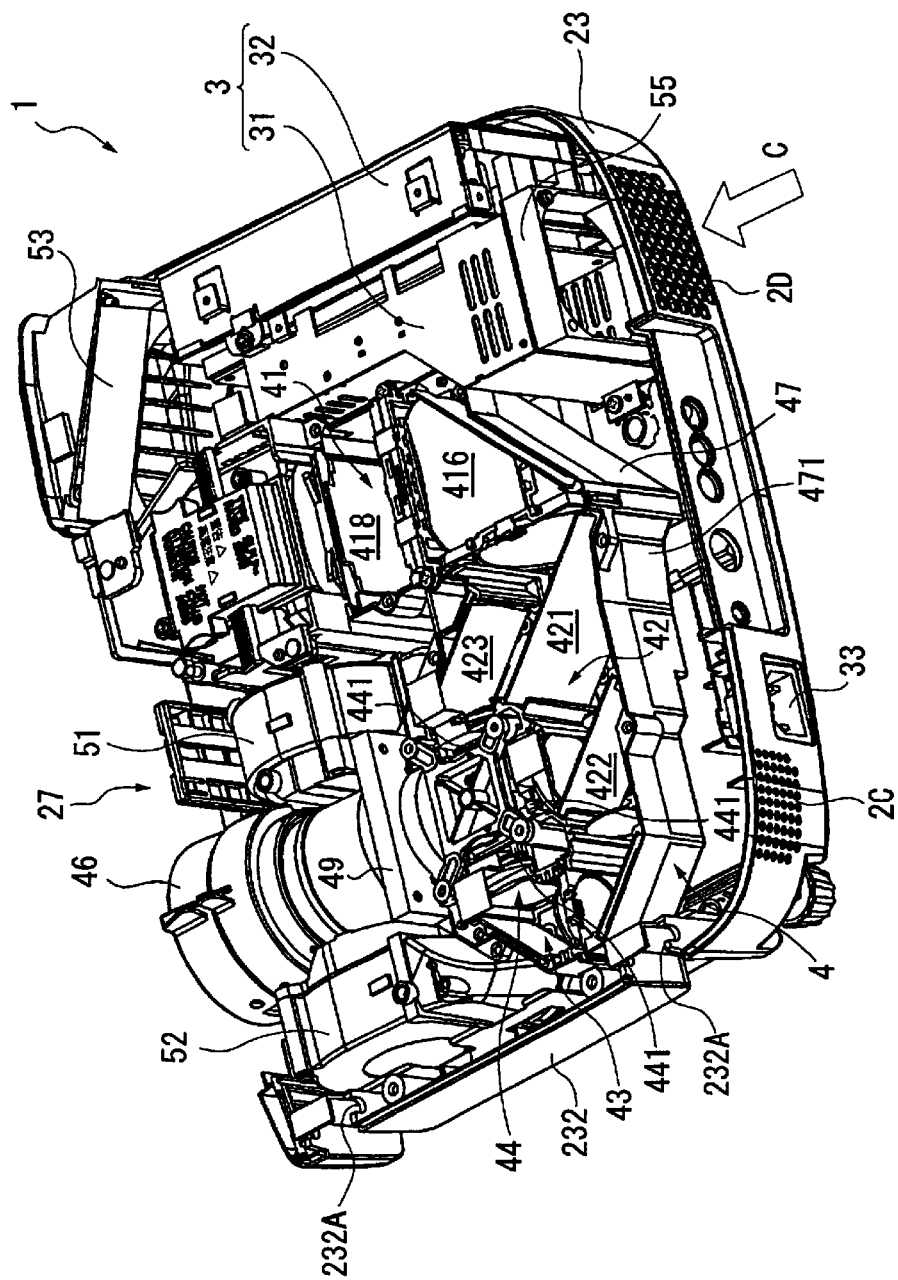
FIG. 4 is a perspective view showing the projector of FIG. 3 with shield plate, driver board and upper light guide thereof being detached seen from back side.
Figure 5:
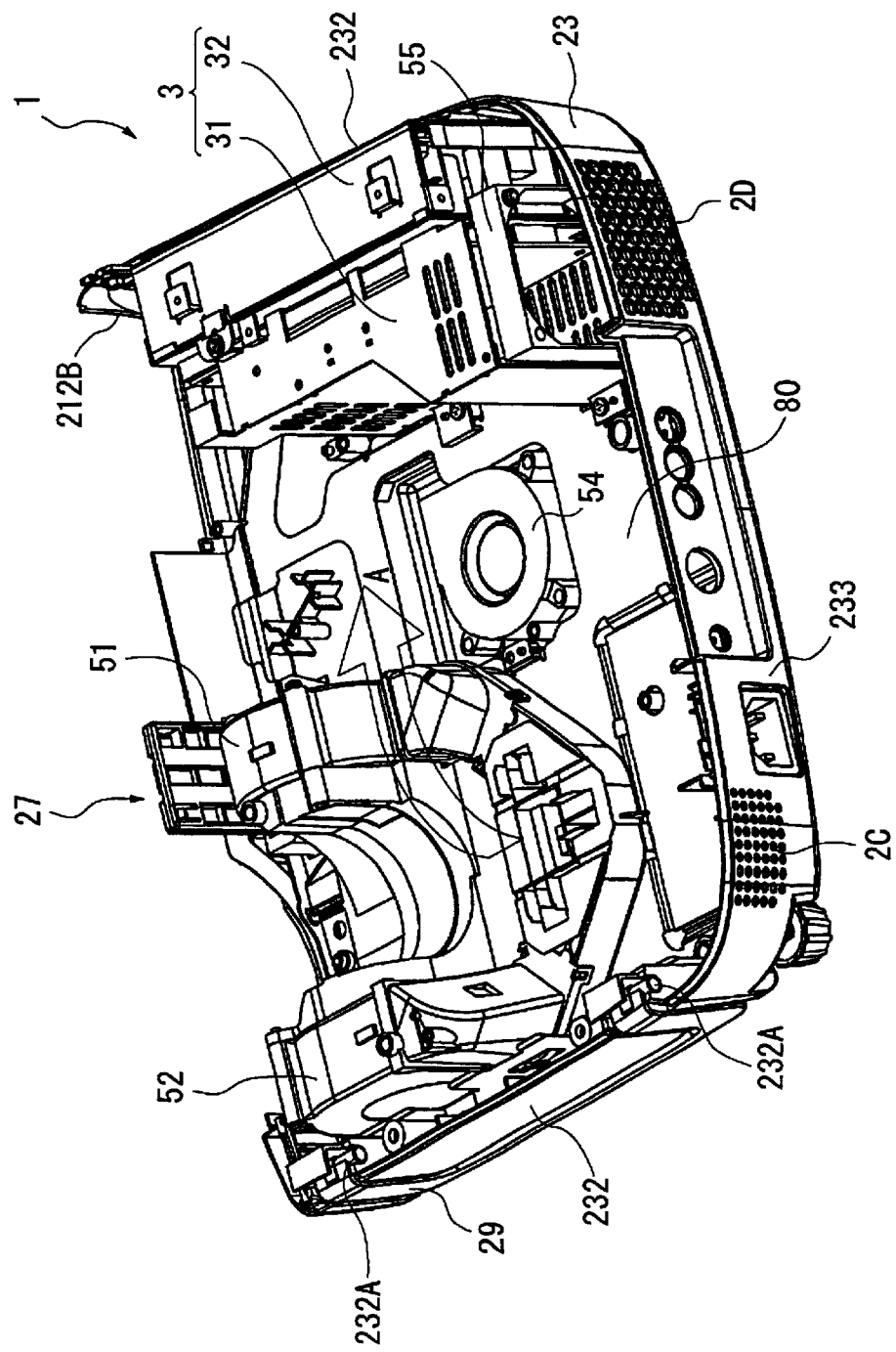
FIG. 5 is a perspective view showing the projector of FIG. 4 with optical unit thereof being detached.

FIG. 1 is an entire perspective view showing a projector 1 according to an embodiment of the present invention seen from above, FIG. 2 is an entire perspective view showing the projector 1 according to the aforesaid embodiment seen from below, and FIGS. 3 to 5 are perspective view showing an inside of the projector 1. Specifically, FIG. 3 is a perspective view showing the projector 1 of FIG. 1 with an upper case 21 being detached, FIG. 4 is a perspective view showing the projector 1 of FIG. 3 with a shield plate 80, a driver board 90 and an upper light guide 472 (shown in FIG. 6) being detached seen from back side, and FIG. 5 is a perspective view showing the projector 1 of FIG. 4 with an optical unit 4 being detached. The components 4, 21, 80, 90 and 472 constituting the projector will be described below in detail.

In FIGS. 1 to 3, the projector 1 has an exterior case 2, a power source unit 3 accommodated in the exterior case 2 and a planar U-shaped optical unit 4 disposed in the exterior case 2 and the entirety thereof is formed in an approximately rectangular solid.

The exterior case 2 is composed of resin-made upper case 21, a front case 22, a lower case 23 and an interface cover 213. The upper case 21 and the front case 21 are integrally molded. The interface cover 213 is located at the back side of the projector 1.

The upper case 21 has an upper surface 211 and a side surface 212 provided around the upper surface 211.

A lamp cover 24 is detachably fitted on a front side of the upper surface 211. A notch 211A with an upper side of a projection lens 46 being exposed is provided on a side of the lamp cover 24 on the upper surface 211, so that zooming and focusing operations of the projection lens 46 can be manually conducted through a lever. An operation panel 25 is provided on the back side of the notch 211A.

The front case 22 is provided with a circular opening 212A continuing from the notch 211A of the upper case 21, and the projection lens 46 is located corresponding to the circular opening 212A. An exhaust hole 212B located at the front of the inside power source unit 3 is provided opposite to the circular opening 212A. An exhaust louver 26 for exhausting cooling air in a direction away from an image projection area, i.e. to the left side in FIG. 1, and for shielding light is provided to the exhaust hole 212B.

The lower case 23 is formed of a bottom surface 231, a side surface 232 and a rear surface 233 provided around the bottom surface 231.

A first attitude adjusting mechanism 27 for adjusting inclination in front and back direction of the projector 1 to adjust position the projection image is provided on the front side of the bottom surface 231. A second attitude adjusting mechanism 28 for adjusting inclination of the projector 1 in right and left direction substantially orthogonal with the front and back direction is provided on one of the corners on the back side of the bottom surface 231. A rear foot 231A corresponding to the second attitude adjusting mechanism 28 incapable of adjusting position thereof is provided on the other corner.

The first attitude adjusting mechanism 27 is the attitude adjusting mechanism of the present invention, which will be described below in detail.

An intake hole 231B of cooling air is provided on the bottom surface 231.

An attachment 232A for rotatably attaching a C-shaped handle 29 is provided on one of the side surfaces 232.

Side foots 2A (FIG. 2) to be a leg when the projector 1 is vertically situated with the handle 29 on the upside are provided on the respective side surfaces 212 and 232 of the upper case 21 and the lower case 23 on one side of the exterior case 2.

An interface 2B composed of a recess extending over the interface cover 213 and the back surface 233 of the lower case 23 is provided on the back side of the exterior case 2, and an interface board (not shown) with various connectors being mounted is disposed on the inner side of the interface 2B. A speaker hole 2C and an exhaust hole 2D are provided extending on both sides of the interface cover 213 and the back side 233 of the lower case 23. The exhaust hole 2D is located on the back side of the inside power source unit 3.

As shown in FIG. 4, the power source unit 3 is composed of a power source 31 and a lamp driving circuit (ballast) 32 located on the side of the power source 31.

The power source 31 supplies the electric power supplied through a power cable to the lamp driving circuit 32 and the driver board 90 (FIG. 3) etc. and includes an inlet connector 33 (FIG. 2) for the power cable to be plugged.

The lamp driving circuit 32 supplies the electric power to a power source lamp 411 of the optical unit 4.

Figure 7:
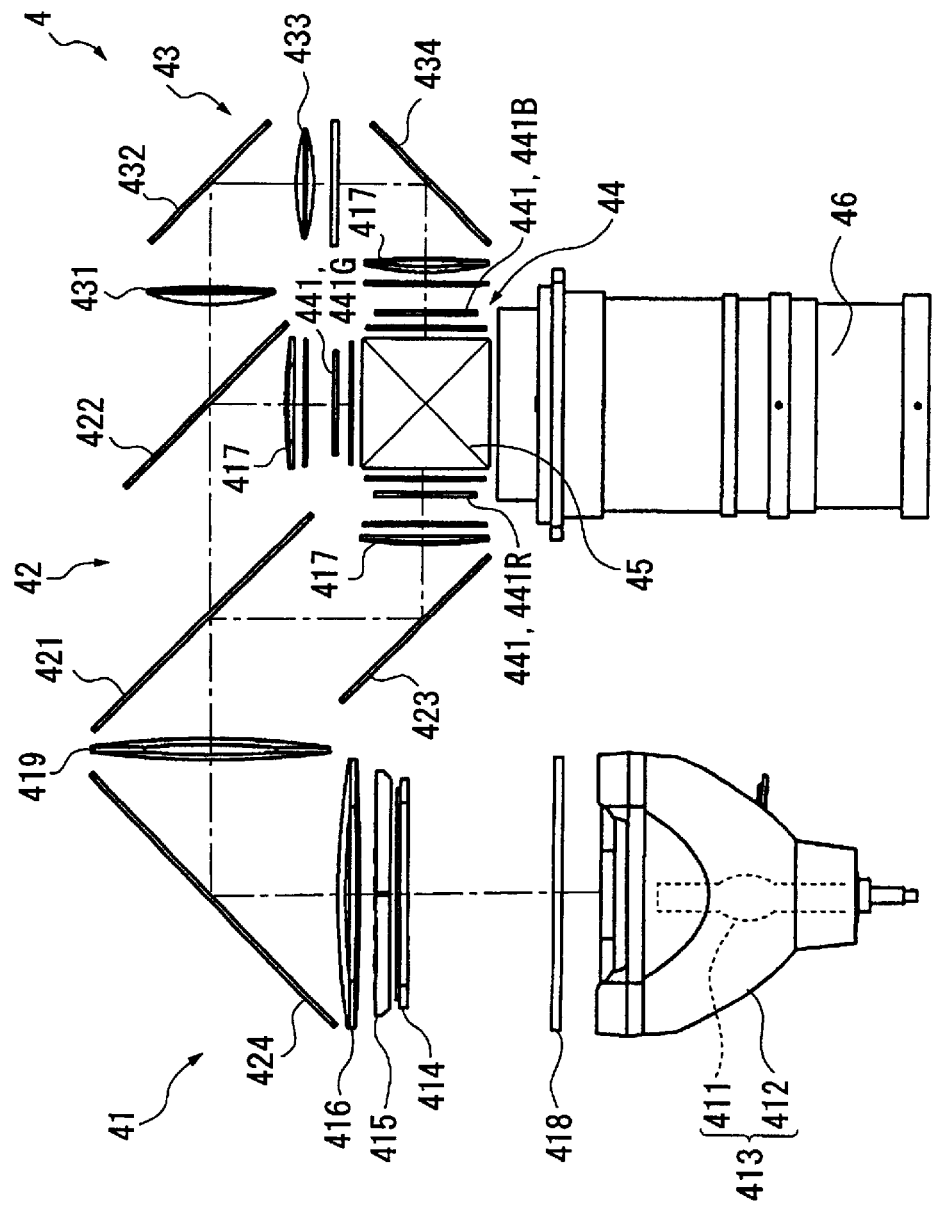
FIG. 7 is a plan view schematically showing the optical unit of the aforesaid embodiment.

As shown in FIG. 7, the optical unit 4 optically processes the light beam irradiated by the light source lamp 411 to form an optical image corresponding to the image information which includes an illuminating optical integrator system 41, a color separating optical system 42, a relay optical system 43, an electric optical device 44, a cross dichroic prism 45 (FIG. 7) as a color combining optical system and the projection lens 46 as a projection optical system.

The power source unit 3 and the optical unit 4 are covered with the surrounding (including upper and lower sides) aluminum shield plate 80 (FIGS. 3 and 5), thereby preventing electromagnetic noise from leaking from the power source unit 3 etc. to the outside.

[2. Detailed Arrangement of Optical System]

In FIG. 7, the illuminating optical integrator system 41 is an optical system for substantially uniformly illuminating the image formation areas of the three liquid crystal panels 441 (respectively represented as liquid crystal panels 441R, 441G and 441B for each color light of red, green and blue), which includes a light source 413, a first lens array 418, a second lens array 414, a polarization converter 415, a first condenser lens 416, a reflection mirror 424 and a second condenser lens 419.

The light source 413 has the light source lamp 411 as a radial light source for emitting radial light beam and a reflector 412 for reflecting the radial light emitted from the light source lamp 411. A halogen lamp, a metal halide lamp, or a high-pressure mercury lamp is often used as the light source lamp 411. A parabolic mirror is used as the reflector 412, however, as well as a parabolic mirror, an ellipsoidal mirror and a parallelizing lens (concave lens) may be used.

The first lens array 418 has a matrix arrangement of lenses having substantially rectangular profile viewed from optical axis direction. The respective lenses split the beam emitted from the light source lamp 411 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 414 has approximately the same arrangement as the first lens array 418, where the lenses are disposed in matrix. The second lens array 414 as well as the first condenser lens 416 and the second condenser lens 419 focuses the image from the respective lenses of the first lens array 418 onto the liquid crystal panel 441.

The polarization converter 415 is disposed between the second lens array 414 and the first condenser lens 416 and is integrated with the second lens array 414 as a unit. The polarization converter 415 converts the light from the second lens array 414 to a single polarized light in order to enhance light utilization efficiency in the electric optical device 44.

Specifically, the respective sub-beams converted into single polarized light by the polarization converter 415 are substantially superposed on the liquid crystal panels 441R, 441G and 441B of the electric optical device 44 by the first condenser lens 416 and the second condenser lens 419. Since the projector 1 (electric optical device 44) of the present embodiment using the liquid crystal panel 441 for modulating polarized light can use only single polarized light, approximately half of the light from the light source lamp 411 cannot be used.

Accordingly, by using the polarization converter 415, all of the light emitted from the light source lamp 411 is converted into single polarized light to enhance light utilization efficiency in the electric optical device 44. Incidentally, such polarization converter 415 is disclosed in, for instance, Japanese Patent Laid-Open publication No. Hei 8-304739.

The color separating optical system 42 has two dichroic mirrors 421 and 422 and a reflection mirror 423, where the mirrors 421 and 422 separate the plurality of sub-beams irradiated from the illuminating optical integrator system 41 into three color lights of red, green and blue.

The relay optical system 43 includes an incident-side lens 431, a relay lens 433 and reflection mirrors 432 and 434, which introduces blue light of the color lights separated by the color separating optical system 42 into the liquid crystal panel 441B.

At this time, the blue light component and the green light component of the light beam irradiated from the illuminating optical integrator system 41 are transmitted through the dichroic mirror 421 of the color separating optical system 42 and the red light component reflected by the dichroic mirror 421. The red light reflected by the dichroic mirror 421 is reflected by the reflection mirror 423, which reaches to the liquid crystal panel 441R for red-color through a field lens 417. The field lens 417 converts the respective sub-beams emitted from the second lens array 414 into a light beam parallel to central axis (main beam). The field lenses 417 provided in front of the other liquid crystal panels 441G and 441B function in the same manner.

In the blue light and the green light transmitted through the dichroic mirror 421, the green light is reflected by the dichroic mirror 422 to reach the liquid crystal panel 441G for green color through the field lens 417. On the other hand, the blue color transmits through the dichroic mirror 422 to pass the relay optical system 43 and reach the liquid crystal panel 441B for blue color through the field lens 417. Incidentally, the relay optical system 43 is used for the blue color in order to prevent decrease in utilization efficiency of light on account of light diffusion caused by longer length of the optical path of the blue light than the length of the optical path of the other color lights, in other words, in order to directly transmit the sub-beam incident on the incident-side lens 431 to the field lens 417.

The electric optical device 44 has the liquid crystal panels 441R, 441G and 441B as three optical modulators which, for instance, use a polysilicon TFT as a switching element. The color lights separated by the color-separating optical system 42 are modulated by the three crystal panels 441R, 441G and 441B in accordance with image information to form an optical image.

The cross dichroic prism 45 combines the images modulated and irradiated from the three liquid crystal panels 441R, 441G and 441B to form a color image. Incidentally, a dielectric multilayer film for reflecting red light and another dielectric multilayer film for reflecting blue light are formed on the prism 45 along boundaries of the four right-angled prisms in an approximately X-shape, the dielectric multilayers combining three color lights. The color image combined by the prism 45 is irradiated from the projection lens 46 and is enlarged and projected on a screen.

Figure 6:
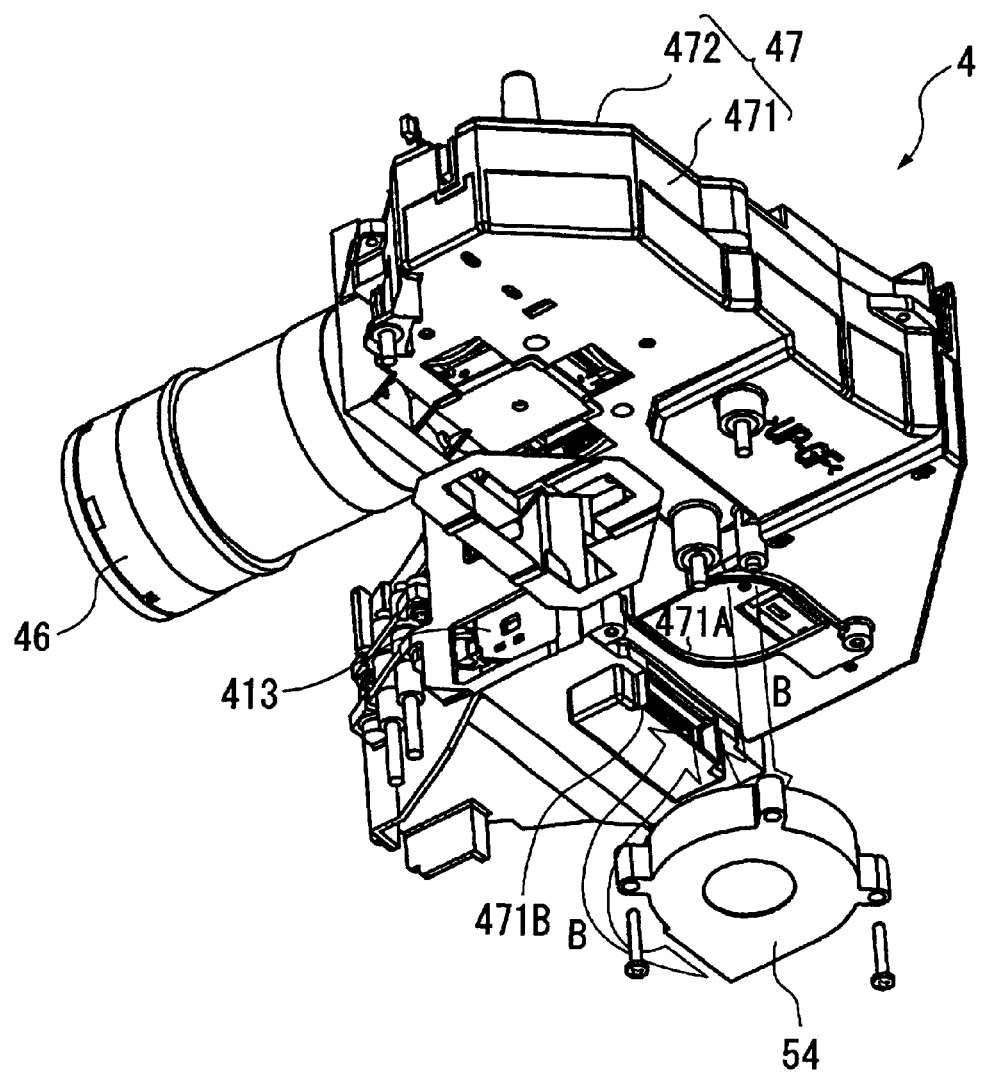
FIG. 6 is a perspective view showing an optical unit of the aforesaid embodiment.

The above-described respective optical components 41 to 45 are accommodated in a synthetic-resin-made light guide as an optical component casing as shown in FIGS. 4 to 6.

The light guide 47 is composed of a lower light guide 471 provided with a groove for slidably fitting the above-described respective optical components 414 to 419, 421 to 423 and 431 to 434 from the above and lid-shaped upper light guide 472 for shutting an upper opening of the lower light guide 471.

A head portion 49 is formed on the light-emitting side of the light guide 47. The projection lens 46 is fixed on the front side of the head portion 49 and a prism 45 attached with the liquid crystal panels 441R, 441G and 441B is fixed on the back side thereof.

[3. Cooling Mechanism]

The projector 1 according to the present embodiment has a panel cooling system A mainly for cooling the liquid crystal panels 441R, 441G and 441B, a lamp cooling system B mainly for cooling the light source lamp 411, and a power source cooling system C mainly for cooling the power source 31.

In FIGS. 2, 4 and 5, a pair of sirocco fans located on both sides of the projection lens 46 are used in the panel cooling system A. The cooling air sucked in from the intake hole 231B on the lower side by the sirocco fans 51 and 52 cools the liquid crystal panels 441R, 441G and 441B from the lower side to the upper side and subsequently comes close to an axial-flow exhaust fan 53 at the front corner while cooling the lower side of the driver board 90 (FIG. 3) to be exhausted from the exhaust hole 212B on the front side.

In FIGS. 4 to 6, a silocco fan 54 provided on the lower side of the optical unit 4 is used in the lamp cooling system B. The cooling air in the projector 1 drawn by the silocco fan 54 enters into the light guide 47 from an opening (not shown) provided on the upper light guide 472 and cools the unitized second lens array 414 and the polarization converter 415 while passing therethrough. Thereafter, the cooling air goes out from the exhaust opening 471A of the lower light guide 471 to be sucked and discharged by the silocco fan 54. The discharged cooling air again enters into the light guide 47 from the intake opening 471B of the lower light guide 471 and invades into the light source 413 to cool the light source lamp 411, and, subsequently, goes out of the light guide 47 to be exhausted from the exhaust hole 212B by the axial-flow exhaust fan 53.

In FIG. 4, an axial-flow intake fan 55 provided at the back side of the power source 31 is used in the power source cooling system C. The cooling air sucked in from the intake hole 2D at the back side by the axial-flow intake fan 55 cools the power source 31 and the lamp driving circuit 32. Subsequently, the cooling air is exhausted from the exhaust hole 212B by the axial-flow exhaust fan 53 in the same manner as the other cooling systems A and B.

[4. Arrangement of the First Attitude Adjusting Mechanism]

Figure 8:
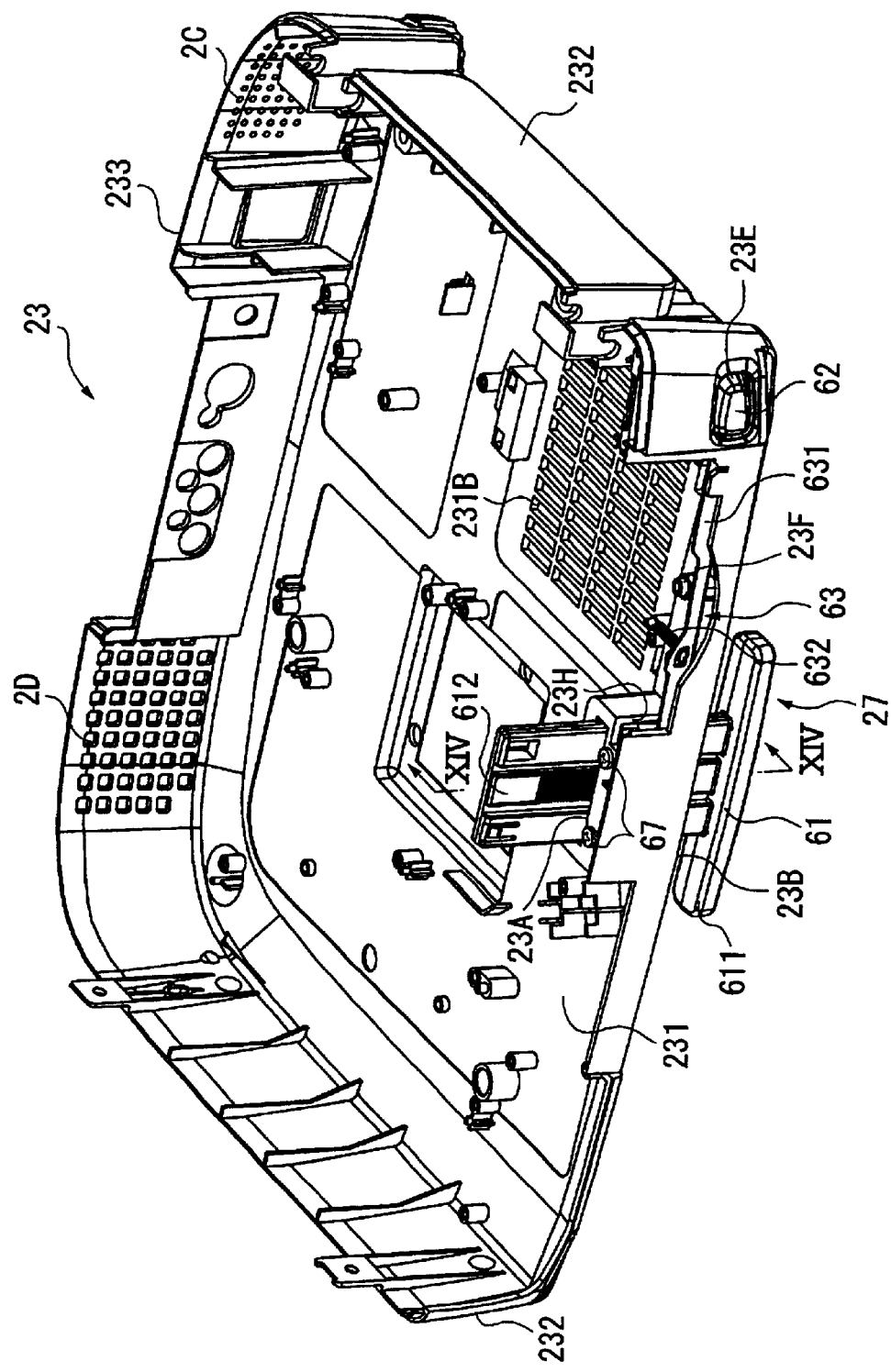
FIG. 8 is a perspective view showing a lower case and first attitude adjusting mechanism of the aforesaid embodiment seen from front side.
Figure 9:
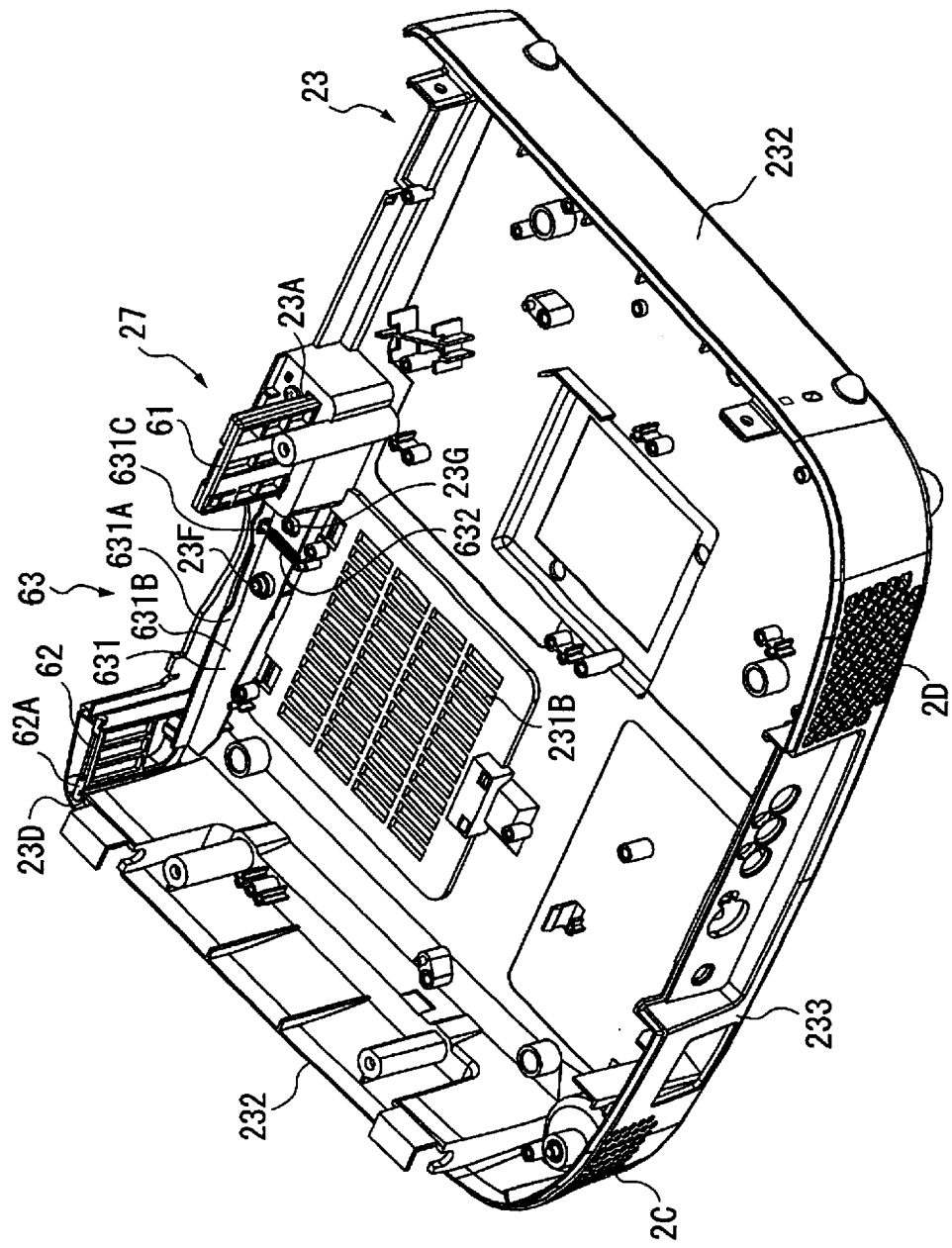
FIG. 9 is a perspective view showing the lower case and the first attitude adjusting mechanism of the aforesaid embodiment seen from back side.
Figure 10:
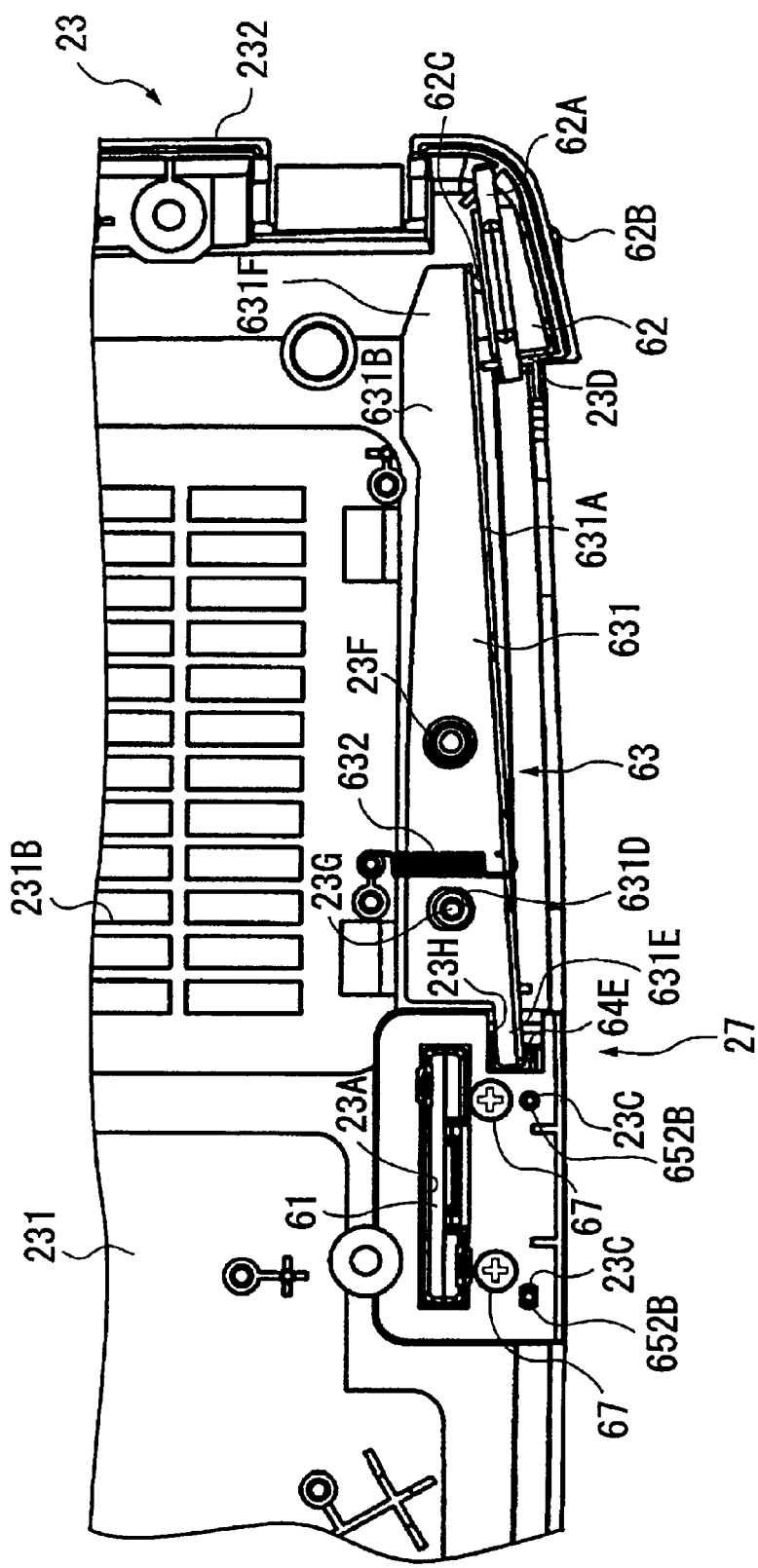
FIG. 10 is a plan view showing a primary portion of the lower case and the first attitude adjusting mechanism of the aforesaid embodiment.

FIGS. 8 to 10 show the above-described lower case 23 attached with the first attitude adjusting mechanism 27. FIG. 8 is a perspective view showing the lower case 23 and the first attitude adjusting mechanism 27 seen from upper front thereof, FIG. 9 is a perspective view showing the lower case 23 and the first attitude adjusting mechanism 27 seen from rear front thereof and FIG. 10 is an enlarged plan view of a primary portion of the lower case 23 and the first attitude adjusting mechanism 27.

In FIGS. 8 to 10, the first attitude adjusting mechanism 27 has a foot member 61 located approximately at the center of the front side of the lower case 23, a manipulation button 62 located at a corner of the front side of the lower case 23 and a link mechanism 63 disposed between the foot member 61 and the manipulation button 62 in the lower case 23 and having a turn lever 631 of approximately L-shaped cross section.

Figure 11:
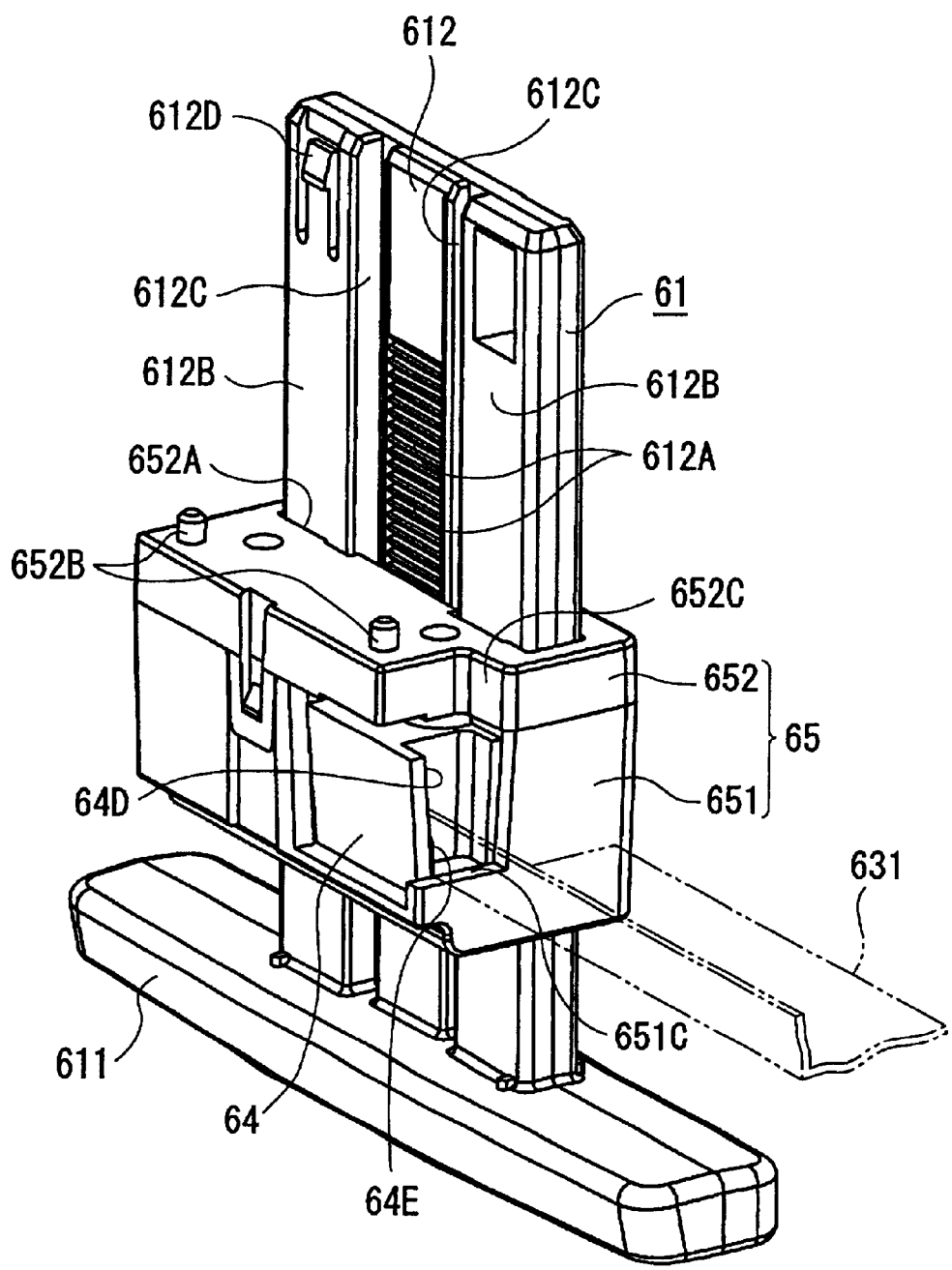
FIG. 11 is an enlarged perspective view showing a primary portion of the first attitude adjusting mechanism of the aforesaid embodiment seen from front side.
Figure 12:
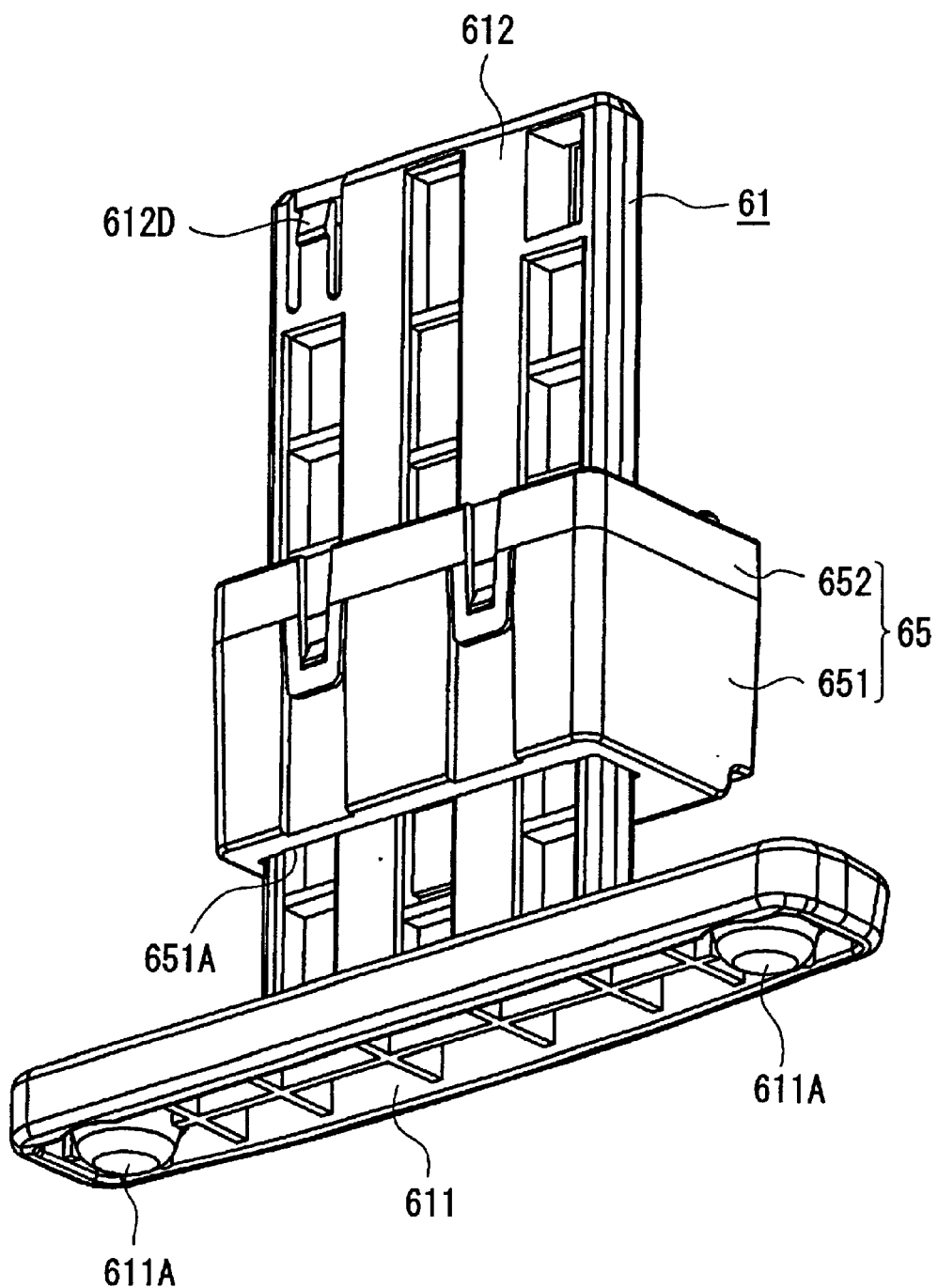
FIG. 12 is an enlarged perspective view showing a primary portion of the first attitude adjusting mechanism of the aforesaid embodiment seen from back side.

As also shown in FIGS. 11 and 12, the foot member 61 has a thin plate ground member 611 grounded on a surface for the projector 1 to be seated and a flat plate member 612 vertically mounted on the ground member 611.

The longitudinal direction of the ground member 611 is aligned to the right and left direction of the projector 1 (horizontal direction substantially orthogonal with the front and back direction of the projector 1). An anti-skid member 611A is provided on both ends of the lower side of the ground member 611, the anti-skid members 611A preventing the foot member 61 being slid when the projector 1 is set.

The flat plate member 612 of the foot member 61 is inserted to an insert hole 23A formed on the lower case 23 (FIGS. 8 to 10) to be advanceable and retractable relative to the lower case 23 in substantially up and down direction.

A plurality of engaging grooves 612A disposed in advancement and retraction direction of the flat plate member 612 are formed at the center of the front side of the flat plate member 612. Slide surfaces 612B slidable relative to the lower case 23 are formed on both sides sandwiching the central portion formed with the engaging groove 612A.

On the front side of the flat plate member 612, two grooves 612C extending in advancement and retraction direction of the flat plate member 612 are formed between the central portion with the engaging groove 612A being formed and the both sides with the slide surfaces 612B being formed.

Incidentally, a fall-stop 612D is provided on the front side of one of the both sides of the flat plate member 612 and on the back side of the other of the both sides.

Figure 13:
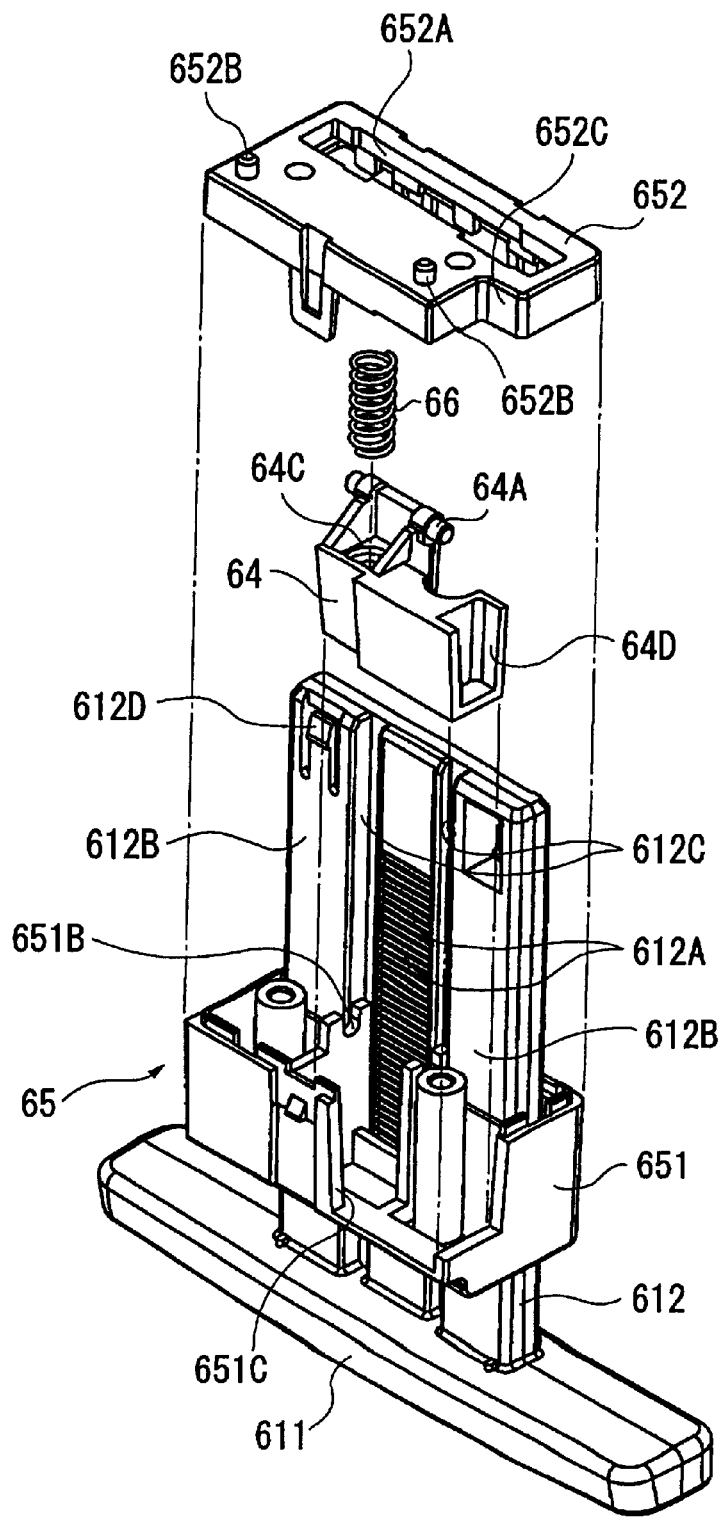
FIG. 13 is an exploded perspective view showing the primary portion of the first attitude adjusting mechanism of FIG. 11.

The advancement and retraction position of the foot member 61 relative to the lower case 23 can be fixed at a desired position by a clamp 64 (FIG. 11). A part of the clamp 64 is located in the clamp housing 65 as shown in FIG. 13.

Figure 14:
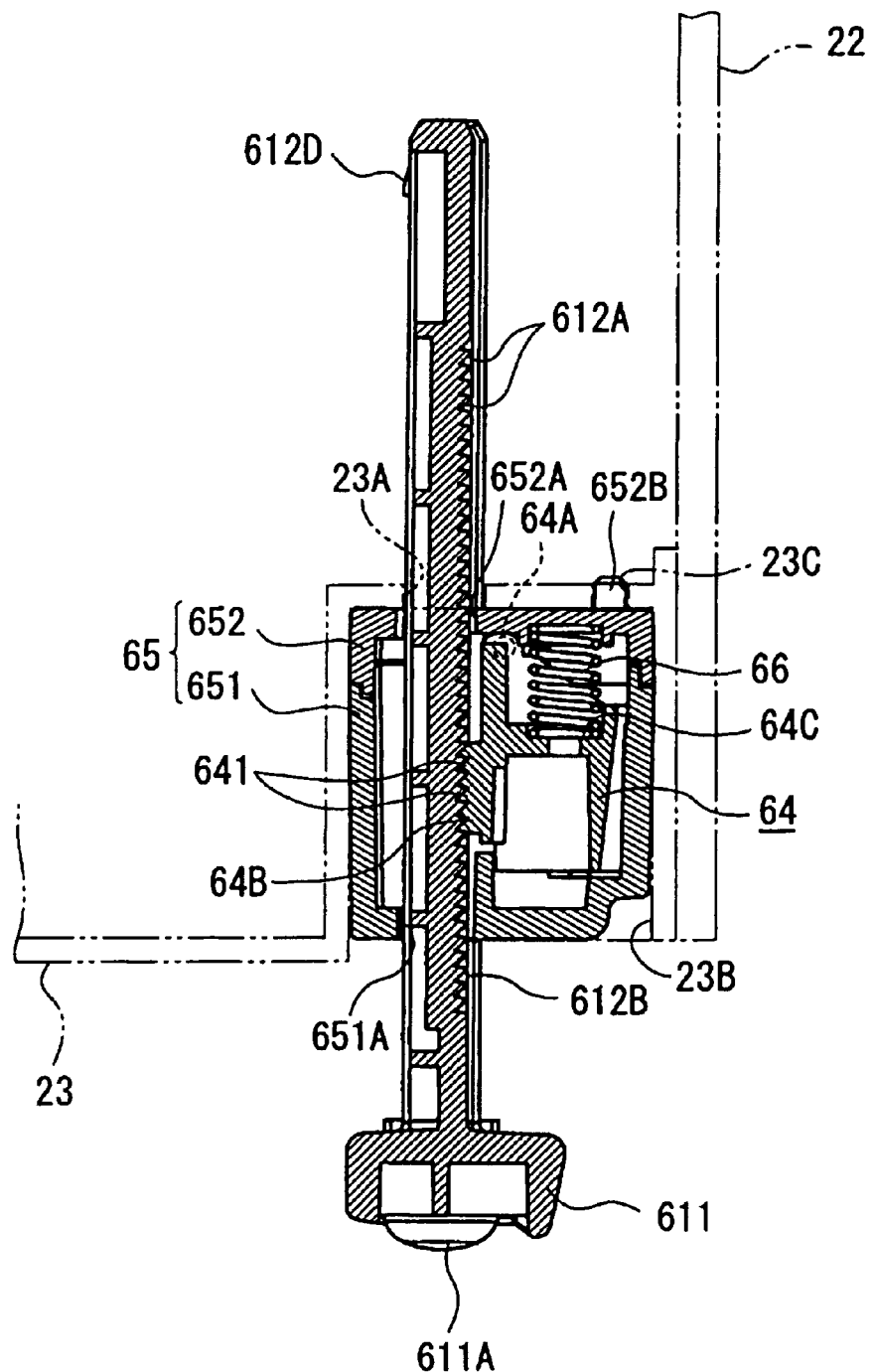
FIG. 14 is a cross section taken along XIV—XIV line of FIG. 8 (where a clamp is engaged with engaging grooves of a foot member)

As shown in FIG. 14, the clamp housing 65 is provided in a recess 23B formed approximately at the center of the front side of the lower case 23 and opened downward. Incidentally, the above-described insert hole 23A of the lower case 23 for the flat plate member 612 of the foot member 61 is also formed on the bottom surface of the recess 23B.

The clamp housing 65 is composed of a box portion 651 with upper side thereof being opened and a lid portion 652 as a lid of the box portion 651. Insert holes 651A and 652A are formed on the box portion 651 and the lid portion 652 respectively, and the flat plate member 612 of the foot member 61 is inserted to the insert holes 651A and 652A so that the foot member 61 is advanceable and retractable in substantially up and down direction relative to the clamp housing 65.

The above-described slide surface 612B of the foot member 61 slides relative to the insert holes 651A and 652A of the clamp housing 65, the slide surfaces 612B keeping good slidability between the foot member 61 and the clamp housing 65.

Incidentally, the fall-stop 612D prevents the foot member 61 from being fallen off from the clamp housing 65.

In FIGS. 13 and 14, the box portion 651 holds the clamp 64 thereinside in a turnable manner, and a support member 651B for supporting both ends of a turn shaft 64A of the clamp 64 is integrally formed in the box portion 651.

The support member 651B is disposed in the two grooves 612C of the above-described foot member 61, so that the support member 651B and the clamp 64 can be located adjacent to the foot member 61.

A side of the box portion 651 is partially cut to form a notch 651C, from which a part of the clamp 64 is exposed to the outside of the box portion 651 (FIG. 11).

A plurality of (two, in the present embodiment) positioning pins 652B project from the upper side of the lid portion 652. The positioning pins 652B are inserted to the positioning holes 23C formed on the bottom surface of the recess 23B of the lower case 23 (see FIG. 10).

The clamp housing 65 is attached to the bottom surface of the recess 23B of the lower case 23 by a screw 67 (FIGS. 8 and 10) after the lid portion 652 is fixed to the box portion 651. Incidentally, the screw 67 is fixed to the box portion 651 penetrating the bottom surface of the recess 23B of the lower case 23 and the lid portion 652.

As described above, the clamp 64 has the turn shaft 64A supported by the clamp housing 65. The turn shaft 64A is aligned in substantially horizontal direction and disposed substantially parallel to the front side of the flat plate member 612 of the foot member 61.

As shown in FIG. 14, an engaging portion 64B to be engaged with the engaging groove 612A of the foot member 61 is formed on a surface substantially opposing the front side of the flat plate member 612 of the foot member 61. The engaging portion 64B is composed of a plurality of projected treads 641 arranged along advancement and retraction direction of the foot member 61.

A compression spring 66 is disposed between the clamp 64 and the lid portion 652 of the clamp housing 65. A spring receiving surface 64C for receiving an end of the compression spring 66 is formed on the clamp 64.

Incidentally, the turn shaft 64A, the engaging portion 64B and the spring receiving surface 64C are formed on a part of the clamp 64 disposed in the clamp housing 65.

On the other hand, a recess 64D opening in upward direction and one side direction (right side in FIGS. 11 and 13) is formed on a part of the clamp 64 (FIGS. 11 and 13) exposed from the notch 651C of the clamp housing 65 to the outside. A first end 631E of the turn lever 631 of the above-described link mechanism 63 is disposed in the recess 64D.

Approximately spherical projection 64E (FIG. 11) is formed on the inner side of the recess 64D being in contact with the first end 631E of the turn lever 631.

Incidentally, a notch 23H corresponding to the opening in the upper direction and the side direction of the recess 64D of the clamp 64 is formed on the recess 23B of the lower case 23. A notch 652C corresponding to the opening in the upper direction of the recess 64D of the clamp 64 is formed on the lid portion 652 of the clamp housing 65.

Back to FIGS. 8 to 10, the manipulation button 62 is formed into a flat plate and is turnable relative to the lower case 23. Both ends of the turn shaft 62A of the manipulation button 62 are supported by the support member 23D integrally formed on the lower case 23 in a manner, though not shown, being prevented from falling off toward the upper direction by the upper case 21.

The turn shaft 62A of the manipulation button 62 is aligned in approximately horizontal direction in the same manner as the turn shaft 64A of the clamp 64 and is disposed substantially in parallel with the front surface of the flat plate member 612 of the foot member 61. Incidentally, in the present embodiment, the direction of the turn shaft 62A of the manipulation button 62 may be set in any manner as long as a second end 631F of the turn lever 631 can be turned from front side toward back side by turning the manipulation button from the front side to the back (depth) side, which may not be the same direction as the turn shaft 64A of the clamp 64.

A button portion 62B projects from the front lower side of the manipulation button 62. On the other hand, a button hole 23E is formed on the front corner of the lower case 23 for the manipulation button 62 to be disposed, so that the button portion 62B is exposed from the button hole 23E to the outside when the manipulation button 62 is attached to the lower case 23.

On a lower part of the backside of the manipulation button 62, an approximately spherical projection 62C projecting from the backside is formed, the projection 62C being in contact with the second end 631F of the turn lever 631 of the link mechanism 63.

The link mechanism 63 includes the turn lever 631 turnable relative to the lower case 23 and a tension spring 632 as a biasing means for biasing the turn lever 631 in one direction.

The turn lever 631 is formed in approximately L-shaped cross section composed of a perpendicular portion 631A and a horizontal portion 631B. The perpendicular portion 631A and the horizontal portion 631B are integrally formed.

The first end 631E of the turn lever 631 disposed in the recess 64D of the clamp 64 has narrower width of the horizontal portion 631B than the other portion so that the dimension of the recess 64D of the clamp 64, i.e. the entire size of the clamp 64, is reduced.

The horizontal portion 631B of the turn lever 631 is turnably attached to a turn shaft 23F formed on the lower case 23 along the perpendicular direction. A slide hole 631D with longitudinal direction thereof substantially aligned in turn direction thereof is formed on the horizontal portion 631B and a guide pin 23G projecting on the upper surface of the lower case 23 is inserted to the slide hole 631D. The guide pin 23G is slidable along the longitudinal direction of the slide hole 631D, the guide pin 23G and the slide hole 631D restricting the turning amount of the turn lever 631 within a predetermined range.

Figure 15:
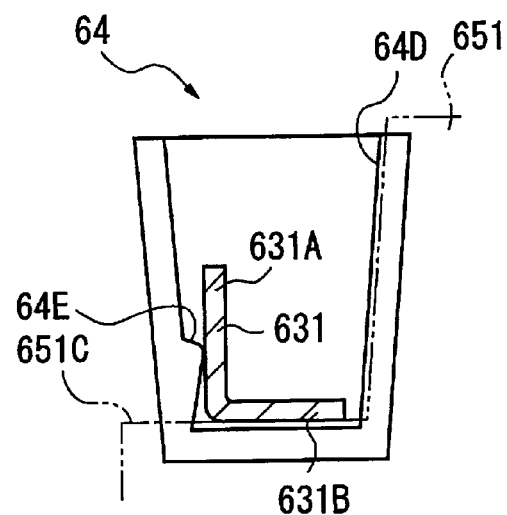
FIG. 15 is an end view showing another primary portion of the first attitude adjusting mechanism of the aforesaid embodiment.
Figure 16:
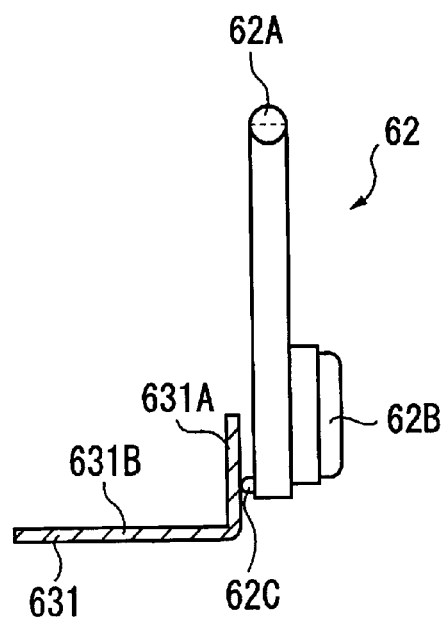
FIG. 16 is an end view showing still another primary portion of the first attitude adjusting mechanism of the aforesaid embodiment.

The perpendicular portion 631A of the turn lever 631 point-contacts to the projection 64E of the clamp 64 by being located in the recess 64D of the clamp 64 on the first end 631E side as shown in FIG. 15, and point-contacts to the projection 62C of the manipulation button 62 on the second end 631F side as shown in FIG. 16. A spring attachment 631C for an end of the tension spring 632 being attached is formed on the perpendicular portion 631A on the first end 631E side of the turn lever 631. An end of the tension spring 632 is attached to the spring attachment 631C of the turn lever 631 and the other end thereof is attached to the lower case 23.

Figure 17A:
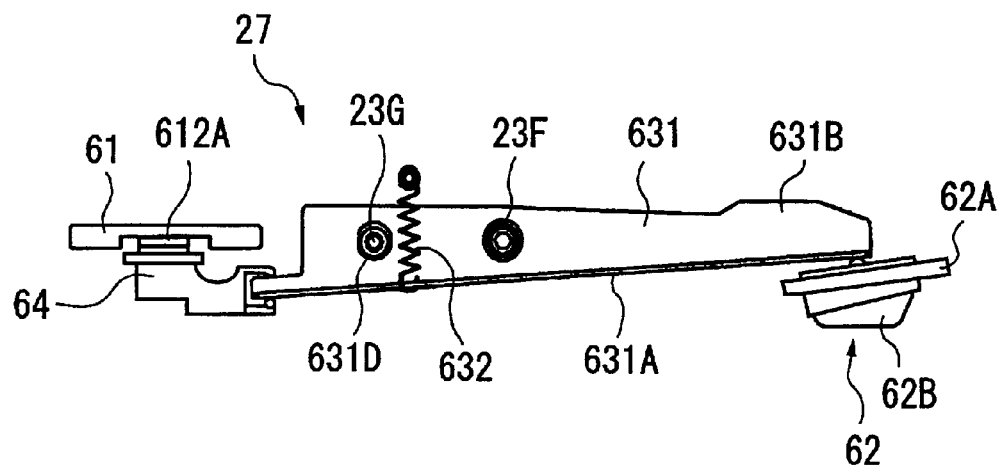
FIG. 17A is a plan view showing a function of the first attitude adjusting mechanism of the aforesaid embodiment.

In thus arranged first attitude adjusting mechanism 27, when the button portion 62B of the manipulation button 62 is not pressed as shown in FIG. 17(A), no force is applied from the manipulation button 62 to the turn lever 631.

Accordingly, by virtue of the biasing force of the tension spring 632, the first end 631E of the turn lever 631 is located at a depth (rear side) turn end and the second end 631F is located at front turn end. The manipulation button 62 is pressed to the inner side of the lower case 23 by the second end 631F of the turn lever 631 and the button portion 62B is prominently exposed from the button hole 23E of the lower case 23 to the outside.

By pressing the second end 631F of the turn lever 631 to the projection 62C of the manipulation button 62 by the biasing force of the tension spring 632, shakiness between the turn lever 631 and the manipulation button 62 can be prevented. Further, since the button portion 62B is prominently exposed from the button hole 23E of the lower case 23 to the outside, the inside of the projector 1 is not easily seen from the button hole 23E, thereby improving appearance thereof.

The spring receiving surface 64C of the clamp 64 is pressed downward by the biasing force of the compression spring 66 and the engaging portion 64B of the clamp 64 is engaged with the engaging groove 612A of the foot member 61. Accordingly, the foot member 61 cannot be moved relative to the clamp 64, so that the advancement and retraction position relative to the lower case 23 is fixed, thereby fixing the attitude of the projector 1.

Figure 17B:
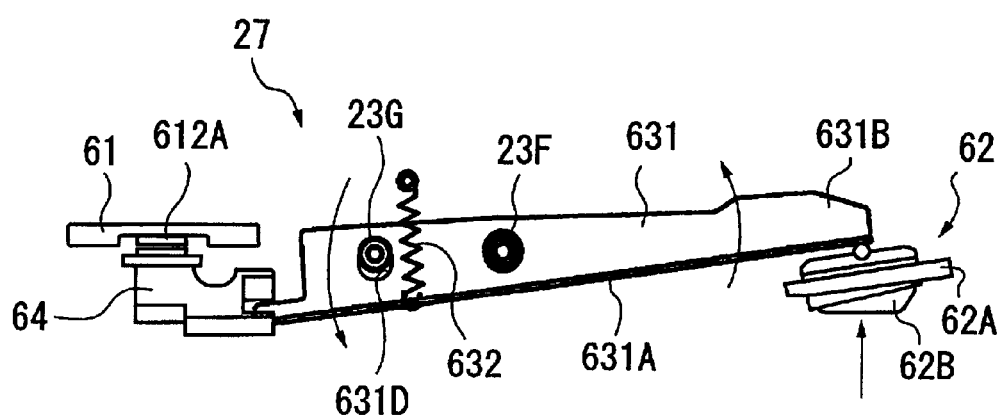
FIG. 17B is a plan view showing a function of the first attitude adjusting mechanism of the aforesaid embodiment.

On the other hand, when the button portion 62B of the manipulation button 62 is pressed as shown in FIG. 17(B), the manipulation button 62 is turned from the front side to the depth side, the second end 631F (an end for the manipulation button 62 to be in contact with) of the turn lever 631 is turned from the front side to the depth side and the first end 631E (an end for the clamp 64 to be in contact with) is turned from the depth side to the front side overcoming the force of the tension spring 632.

Figure 18:
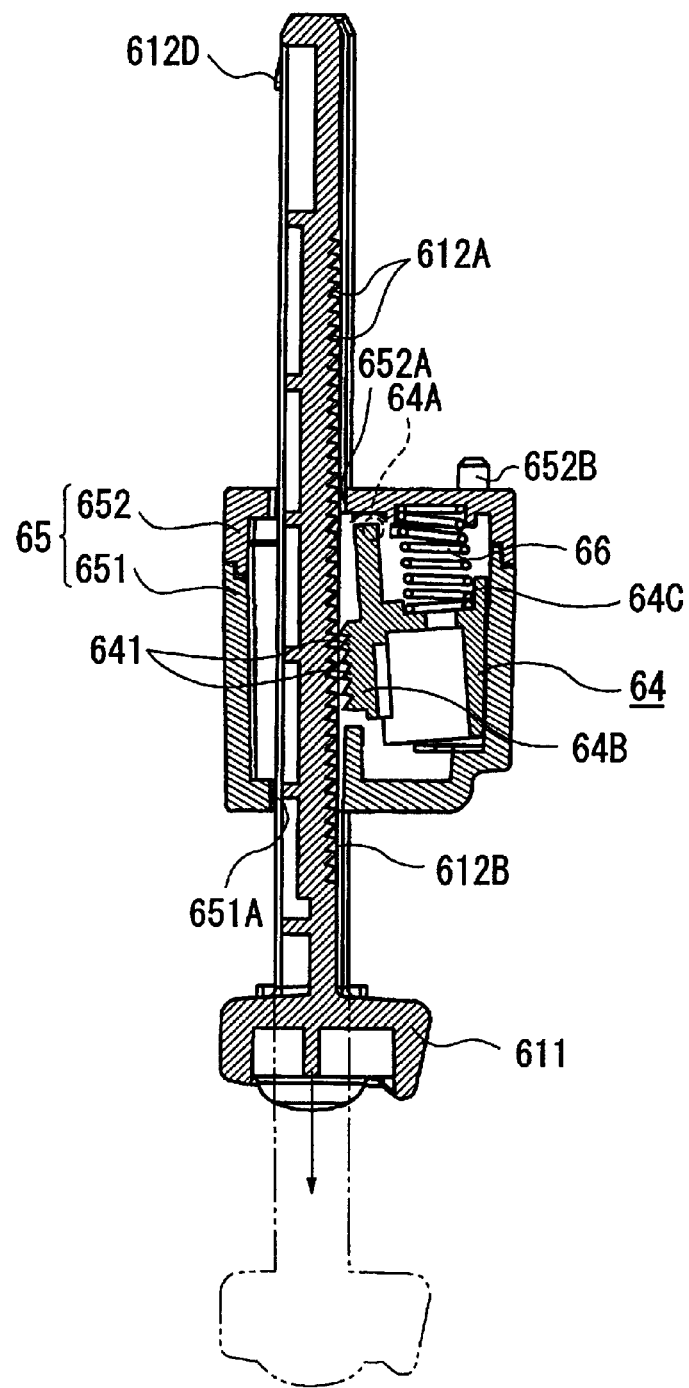
FIG. 18 is a cross section taken along XIV—XIV line of FIG. 8 (where a clamp is out of engagement with the engaging grooves of the foot).

The clamp 64 is in contact with the first end 631E of the turn lever 631, and a force from the depth side to the front side works on the clamp 64 by the turn lever 631. Accordingly, the clamp 64 is turned from the depth side to the front side overcoming the force of the compression spring 66 as shown in FIG. 18, so that the engaging portion 64B of the clamp 64 is separated from the engaging groove 612A of the foot member 61 to be out of the engagement thereof.

When the engagement of the engaging portion 64B of the clamp 64 is released, the foot member 61 can be moved relative to the clamp 64, so that the degree of retraction and advancement of the foot member 61 can be adjusted by changing advancement and retraction position relative to the lower case 23.

When the force applied to the button portion 62B of the manipulation button 62 is removed, the clamp 64, the turn lever 631 and the manipulation button 62 are returned to the condition shown in FIGS. 14 and 17(A) by virtue of the compression spring 66 and the tension spring 632, thereby fixing the advancement and retraction position of the foot member 61 relative to the lower case 23 at a desired position.

Next, specific processes for adjusting the attitude of the projector 1 will be described below.

In adjusting the attitude of the projector 1 in front and back direction, both of the front corners of the projector 1 are initially grabbed by both hands to lift the front side of the projector 1 and the manipulation button 62 is pressed with fingers of one hand to release fixing of the advancement and retraction position of the foot member 61 relative to the lower case 23.

Keeping the above condition, the inclination in front and back direction of the projector 1 is changed with both hands. While the fixing by the clamp 64 is released, the foot member 61 slides off the lower case 23 to be extended by virtue of self weight until the fall-stop 612D touches the lower case 23.

After appropriately adjusting the advancement and retraction position of the foot member 61 relative to the lower case 23, the finger is released from the manipulation button 62, so that the clamp 64 is again engaged with the engaging groove 612A of the foot member 61 to fix the foot member 61 at a desired advancement and retraction position, thereby completing the attitude adjusting work with the attitude of the projector 1 in front and back direction being fixed in a desired manner.

According to the above-described present embodiment, following advantages can be obtained.

Since the manipulation button 62 of the first attitude adjusting mechanism 27 is disposed on the front corner of the lower case 23, the manipulation button 62 can be manipulated with fingers of one hand while supporting the both of the front corners of the lower case 23 with both hands in adjusting the attitude of the projector 1. Accordingly, since the adjustment work can be conducted while supporting the projector 1 in a stable condition, the inclination in right and left direction approximately orthogonal with the front and back direction of the projector 1 is not likely to be caused, thereby enhancing workability during attitude adjusting work of the projector 1.

Since the engagement of the clamp 64 with the foot member 61 is released by the combination of turning movement of the manipulation button 62, the clamp 64 and the turn lever 631, the manipulation button 62, the clamp 64 and the turn lever 631 can be assembled in the lower case 23 only by attachment to the lower case 23 through the respective turn shaft 62A, 64A and 23F thereof, thereby facilitating assembly work.

Since a mechanism with a combination of the turning movement of the manipulation button 62, the clamp 64 and the turn lever 631 is used, as compared to a mechanism of combination of linear movement for instance, a space for forming a guide and providing the guide is not necessary, thus simplifying the structure and reducing space thereof.

In the first attitude adjusting mechanism 27, since the slide surfaces 612B are formed on both sides of the flat plate member 612 of the foot member 61, the foot member 61 can be stably slid relative to the lower case 23. Accordingly, the attitude of the engaging groove 612A of the foot member 61 relative to the clamp 64 can be retained approximately constant, thereby securely conducting engaging and releasing the clamp 64 relative to the engaging groove 612A.

Since the foot member 61 has the flat plate member 612, the front side of the projector 1 can be stably supported when the foot member 61 is fixed at a desired advancement and retraction position.

In the first attitude adjusting mechanism 27, since the support member 651B for supporting the turn shaft 64A of the clamp 64 is disposed in the groove 612C of the foot member 61, the support member 651B and the clamp 64 can be disposed adjacent to the foot member 61. Accordingly, the turn amount of the clamp 64 can be reduced when the clamp 64 is turned to cause the clamp 64 into and out of engagement with the foot member 61, and space thereof can be reduced.

Since the support member 23D for supporting the turn shaft 62A of the manipulation button 62 is integrally formed on the lower case 23, the number of the components can be reduced. Further, since it is only necessary to attach the turn shaft 62A of the manipulation button 62 to the support member 23D of the lower case 23 in assembling, thereby improving workability during assembly process.

Since the first end 631F of the turn lever 631 and the clamp 64 point-contact and the second end 631E of the turn lever 631 and the manipulation button point-contact, the force applied between the first end 631E of the turn lever 631 and the clamp 64, and the force applied between the second end 631F of the turn lever 631 and the manipulation button 62 can be applied on the respective contact points. Accordingly, the turn amount of the turn lever 631 and the clamp 64 in manipulating the manipulation button 62 can be made constant, thereby securely interlocking the manipulation of the manipulation button 62 with the movement of the clamp 64.

Since the tension spring 632 as a biasing means is provided to the link mechanism 63, the second end 631F of the turn lever 631 can be pressed on the projection 62C of the manipulation button 62 to keep the contact of the second end 631F of the turn lever 631 with the manipulation button 62, thereby preventing shakiness between the turn lever 63 and the manipulation button 62.

Since the button portion 62B is prominently exposed from the button hole 23E of the lower case 23 to the outside by virtue of the biasing force of the tension spring 632 when the manipulation button 62 is not pressed, the inside of the projector 1 is difficult to be seen from the button hole 23E, thereby improving appearance.

Since the biasing means for biasing the turn lever 631 is the tension spring 632, the tension spring 632 can be attached to the spring attachment 631C of the turn lever 631 by stretching an end of the tension spring 632 while the other end of the tension spring 632 is fixed to the lower case 23, so that the attachment is not necessary to be conducted while compressing the spring as with the compression spring, thereby facilitating attachment work of the biasing means.

Since the compression spring 66 for biasing the spring receiving surface 64C of the clamp 64 downward is provided, the engagement of the clamp 64 with the foot member 61 can be securely retained by the biasing force of the compression spring 66. Accordingly, when the attitude of the projector 1 is fixed, the attitude can be securely kept. On the other hand, immediately after adjusting the attitude of the projector 1, i.e. immediately after releasing the manipulation button 62, the clamp 64 can be immediately returned to engagement, thereby securely keeping the desired attitude after adjustment.

Incidentally, the scope of the present invention is not restricted to the above specific embodiment, but includes modifications and improvement as long as an object of the present invention can be attained.

For instance, the biasing means is not restricted to the tension spring, but may be any biasing means such as compression spring, plate spring and elastic rubber.

In order to point-contact the first end of the turn lever and the clamp and the second end of the turn lever and the manipulation button, the projection may not be formed on the clamp and the manipulation button but may be formed on the turn lever. The configuration of the projection is not restricted to the spherical shape but may be conic such as substantial cone or needle-shape.

The contact among the turn lever, the clamp and the manipulation button is not restricted to be point-contact, but may be linear contact and face contact. The turn lever, the clamp and the manipulation button may be, for instance, turnably connected. In such arrangement, the engagement of the clamp can be released by the combination of turning movement of the turn lever, the clamp and the manipulation button.

The support for supporting the turn shaft of the manipulation button may not be integrally formed inside the casing. The support member for supporting the turn shaft of the clamp may not be disposed in the groove of the foot member.

The foot member may not be formed into a flat plate. For instance, the foot member may be composed of a plurality of shafts arranged along a direction substantially orthogonal with the advancement and retraction direction of the foot member. In such arrangement, the slide surface may be formed on the shaft arranged on the outside and a plurality of engaging grooves may be formed on the shaft located approximately at the center.

The manipulation button may not be turnable relative to the casing, but may be fixed on the other end of the turn lever or may be slidable relative to the casing from front side to the back side and from back side to the front side. In such arrangement, the engagement of the clamp can also be released by pressing the manipulation button.

The projector is not restricted to have three optical modulators, but the present invention can also be applied to a projector using a single optical modulator, two optical modulators and more than three optical modulators. Further, though the liquid crystal panel is used as an optical modulator, an optical modulator other than the liquid crystal such as a device using a micro mirror may be used. Further, though a transmission-type optical modulator having light-incident surface different from the light-emitting surface is used in the aforesaid embodiment, a reflection-type optical modulator having the same light-incident surface and the light-emitting surface may be used. Though an example of front-type projector for projecting the light beam in a direction for observing the screen is described in the above-described embodiment, the present invention can be applied to a rear-type projector for projecting the light beam from a side opposite to the screen-observing side.

What is claimed is:

1. A projector, comprising:
   an optical system that modulates a light beam irradiated by a light source and projects the light beam in an enlarged manner to form a projection image; and
   a casing that accommodates the optical system, the projection image being projected in a direction from a back side of the casing toward a front side thereof, the casing including an attitude adjusting mechanism that adjusts an attitude of the casing, the attitude adjusting mechanism comprising:
   a foot member disposed approximately at the center of the front side of the casing, the foot member being advanceable and retractable relative to the casing;
   a clamp that engages with any of a plurality of engaging grooves formed on the foot member and arranged in an advancement and retraction direction of the foot member to fix the foot member at a desired advancement and retraction position;
   a manipulation button disposed at a corner on the front side of the casing that causes the clamp out of engagement with the engaging groove; and
   a link mechanism that interlocks manipulation of the manipulation button with a movement of the clamp,
   wherein the clamp is held in a manner turnable relative to the casing,
   wherein the link mechanism includes a turn lever held in a manner turnable relative to the casing, and
   wherein engagement of the clamp is released by a combination of turning movement of the clamp and the turn lever.

2. The projector according to claim 1,
   wherein the foot member is formed approximately into a flat plate,
   wherein the plurality of engaging grooves are formed at a central portion of the flat plate, and
   wherein a slide surface slidable relative to the casing is formed on both sides of the flat plate sandwiching the central portion.

3. The projector according to claim 1, wherein the manipulation button is held in a manner turnable relative to the casing, the turn of the manipulation button being transmitted to the turn lever.

4. The projector according to claim 3,
   wherein a support member for supporting the turn shaft of the manipulation button is integrally formed inside the casing.

5. The projector according to claim 1,
   wherein a support member that supports a turn shaft of the clamp is provided to the casing.

6. The projector according to claim 5,
   wherein a groove extending along the advancement and the retraction direction of the foot member is formed between the central portion and the both sides, the support member being disposed in the groove.

7. The projector according to claim 1,
   wherein a first end of the turn lever is point-contacted with the clamp, and
   wherein a second end of the turn lever is point-contacted with the manipulation button.

8. The projector according to claim 7,
   wherein the link mechanism has a biasing means that biases the turn lever in a direction along a turning direction thereof to keep the second end of the turn lever in contact with the manipulation button.

9. The projector according to claim 8, wherein the biasing means is a tension spring.

* * * * *